United States Patent [19]

Saito et al.

[11] Patent Number: 4,833,919

[45] Date of Patent: May 30, 1989

[54] DEVICE FOR MEASURING DISPLACEMENT

[75] Inventors: Yasuo Saito; Koichi Shimizu; Yuji Seki, all of Saitama, Japan

[73] Assignee: Kanto Seiki Co., Ltd., Omiya, Japan

[21] Appl. No.: 123,800

[22] Filed: Nov. 23, 1987

Related U.S. Application Data

[62] Division of Ser. No. 845,537, Mar. 28, 1986, Pat. No. 4,723,446.

[30] Foreign Application Priority Data

Apr. 4, 1985 [JP] Japan ................................ 60-71766
Apr. 19, 1985 [JP] Japan ............................ 60-57389[U]
Oct. 2, 1985 [JP] Japan .......................... 60-149963[U]

[51] Int. Cl.⁴ ...................... G01D 5/20; G01F 23/62
[52] U.S. Cl. ................................ 73/313; 73/DIG. 5; 324/208; 336/75; 340/870.16
[58] Field of Search ................. 73/313; 324/208, 207; 340/870.16; 336/30, 75

[56] References Cited

U.S. PATENT DOCUMENTS

| | | | |
|---|---|---|---|
| 2,424,766 | 7/1947 | Miner | 73/313 X |
| 2,525,438 | 10/1950 | Wuerfel | 336/75 X |
| 2,981,909 | 4/1961 | Smith | 336/75 X |
| 3,495,456 | 2/1970 | Ohno | 73/313 X |
| 4,006,637 | 2/1977 | Kinosita | 73/290 R X |
| 4,080,592 | 3/1978 | Zabler | 336/75 X |
| 4,447,743 | 5/1984 | Bean et al. | 324/207 |
| 4,723,446 | 2/1988 | Saito et al. | 324/208 X |

FOREIGN PATENT DOCUMENTS 0003370 1/1978 Japan .................................... 73/313
0040708 4/1981 Japan .................................... 73/313

Primary Examiner—Daniel M. Yasich
Attorney, Agent, or Firm—Foley & Lardner, Schwartz, Jeffery, Schwaab, Mack, Blumenthal & Evans

[57] ABSTRACT

Herein disclosed is a device for measuring a displacement of a movable member relative to a fixed member by putting the electromagnetic induction into practical use. The device comprises a first coil having first and second coil sections which are coaxially aligned along a common axis, a second coil arranged to establish a magnetic coupling with the first coil and extending along the common axis, and a short circuit ring arranged to establish a magnetic coupling with the first and second coils and movable relative to the same. The winding density of each of the first and second coil sections is gradually decreased from the outside end to the inside end thereof, and the winding density of the second coil is substantially even throughout the length of the same.

43 Claims, 17 Drawing Sheets

DEVICE FOR MEASURING DISPLACEMENT

This application is a division of application Ser. No. 845,537, filed Mar. 28, 1986 now issued as U.S. Pat. No. 4,723,446.

BACKGROUND OF THE INVENTION

1. Field of the Invention

The present invention relates in general to a device for measuring a displacement of a movable member relative to a fixed member, and more particularly to a device for measuring the displacement by using the electromagnetic induction phenomenon. More specifically, the present invention is concerned with a device for detecting a liquid level in a container by putting the electromagnetic induction phenomenon into practical use.

2. Description of the Prior Art

As one of the conventional liquid level detecting devices, there has been proposed such a device as disclosed in FIG. 1 of the attached drawings. The device "A" disclosed is of a so-called "variable resistance type" arranged in a container in which a liquid to be measured is contained.

The device "A" comprises a zig-zag resistor pattern "B" and an elongate conductive pattern "C" which are arranged in parallel and printed on a rectangular insulating base plate "D". The base plate "D" is fixed in the container to extend vertically. A float E is disposed about the base plate "D" so as to be vertically movable relative to the fixed base plate in accordance with a rise and fall of the level of the liquid in the container. Two conductive sliders "$F_1$" and "$F_2$" are carried by the float "E" with their leading ends slidably contacting with the two patterns "B" and "C", respectively. The two patterns "B" and "C" and the sliders "$F_1$" and "$F_2$" thus constitute a variable resistor the resistance of which changes in accordance with the vertical movement of the float "E", that is, in accordance with the fluctuation of the liquid level in the container. The zig-zag pattern "B" (viz., the measuring resistor) is connected to an electric power source "G" through a fixed resistor "H". The voltage fluctuation thus appearing between the measuring resistor "B" and the fixed resistor "H" due to the fluctuation of the liquid level is detected by a voltage detecting circuit "I" and the voltage fluctuation thus detected is treated by an indicating circuit "J" to indicate the amount of the liquid in the container.

However, the above-mentioned device "A" has suffered from the drawback that due to the mechanical contact between each slider "$F_1$" or "$F_2$" and the printed pattern "B" or "C", long use of the device induces remarkable wear of the measuring resistor "B" changing the original resistance value of the same. This causes erroneous measuring of liquid level. In the severest case, the measuring pattern "B" is broken because of the wear.

Furthermore, due to a friction inevitably produced between each slider "$F_1$" or "$F_2$" and the printed pattern "B" or "C", the upward or downward movement of the float "E" is not smoothly carried out thereby causing erroneous indication of liquid level. This undesirable phenomenon becomes severer when foreign matter gets in between the sliders and the printed patterns accidentally.

SUMMARY OF THE INVENTION

It is therefore an essential object of the present invention to provide a measure for solving the above-mentioned drawbacks.

It is another object of the present invention to provide a device for measuring a displacement of a movable member relative to a fixed member by practically using electromagnetic induction phenomenon.

It is still another object of the present invention to provide a device for detecting a liquid level in a container by putting the electromagnetic induction phenomenon into practical use.

According to the present invention, there is provided a device for measuring a displacement of a movable member relative to a fixed member, the device comprising an AC signal source, a first coil mounted to the fixed member and including first and second coil sections which are electrically connected and coaxially aligned along a common axis so that the first coil has a first extreme end constituting an outside end of the first coil section, a middle portion defined between respective inside ends of the first and second coil sections and a second extreme end constituting an outside end of the second coil section, a second coil coaxially disposed in the first coil and mounted to the fixed member so as to establish a magnetic coupling with first coil, one of the first and second coils being connected to the AC signal source to receive an AC signal, a short circuit ring fixed for movement with the movable member, the short circuit ring being axially disposed about the first coil so as to establish a magnetic coupling with the first coil and second coils sand constructed to consume magnetic energy, a float connected to the short circuit ring to cause the short circuit ring to remain on top of a fluid, and means connected to the other of the first and second coils for detecting a change in electromagnetic induction between the first coil and the second coil caused by the short circuit ring and for providing an information signal which is representative of the change, wherein the winding density of each of the first and second coil sections of the first coil is gradually decreased from the outside end to the inside end thereof, and the winding density of the second coil is substantially even throughout its length.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
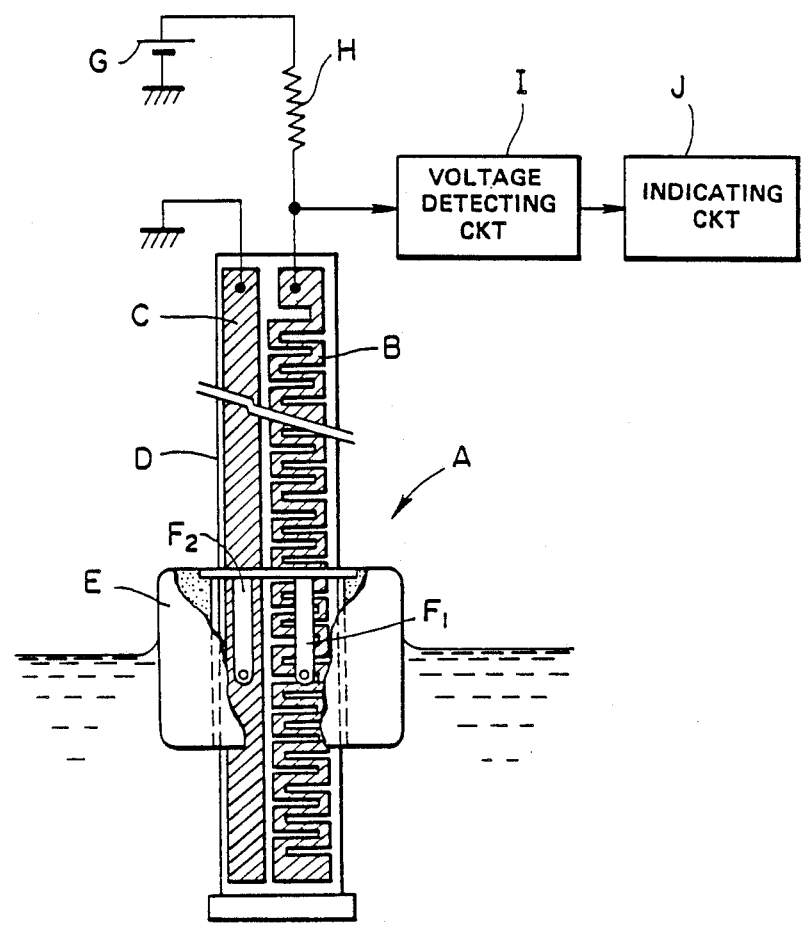
FIG. 1 is a sectional view of a prior art liquid level detecting device as described hereinabove, with some control circuits connected thereto.
Figure 2:
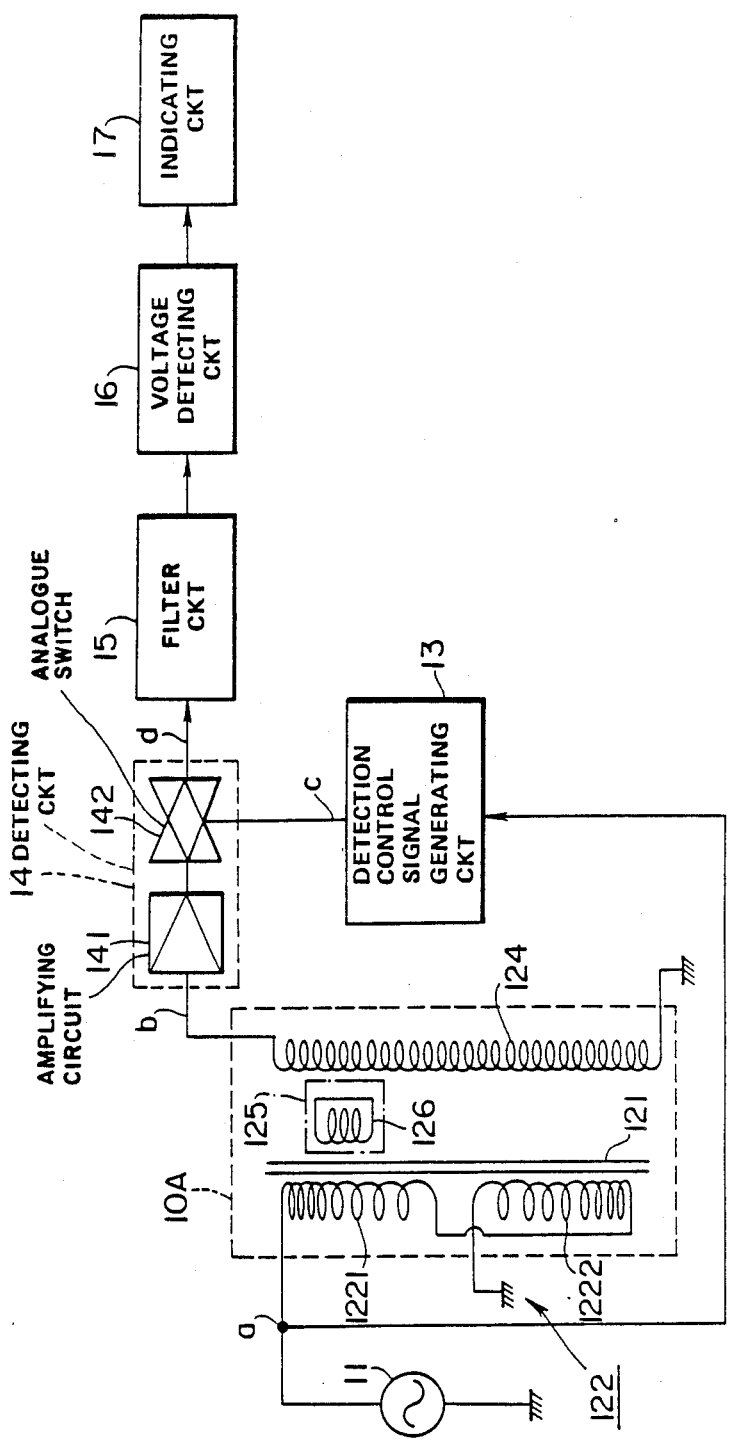
FIG. 2 is a diagramatically illustrated circuit of a liquid level detecting device of a first embodiment of the present invention, with several control circuits connected thereto.

Referring to FIGS. 2 to 6, especially FIG. 2, there is shown an induction type liquid level detecting device 10A of a first embodiment of the present invention with several control circuits associated therewith.

In FIG. 2, denoted by numeral 11 is an AC signal source which supplies both a first coil (or exciting coil) 122 and a detection control signal generating circuit 13 with an AC signal "a" as depicted by FIG. 5a. It is to be noted that the frequency of the AC signal "a" (FIG. 5a) is so determined that elements (such as, operational amplifier and the like) constituting an after-mentioned amplification circuit 14 can exhibit their normal performances. More particularly, the frequency can be held at a low level so long as an undesirable resonance phenomenon due to stray capacitance is avoided. In the disclosed embodiment, the frequency is set at 1 KHz. By receiving the AC signal "a" (FIG. 5a) from the AC signal source 11, the circuit 13 issues a pulse signal "c", as shown in FIG. 5c, which is synchronous with the AC signal "a". Denoted by numeral 14 is a detecting circuit which comprises an amplifying circuit 141 and an analogue switch 142.

The amplifying circuit 141 amplifies the output signal "b" (FIG. 4b) issued from the induction type liquid level detecting device 10A proper which will be described hereinafter in detail. The analogue switch 142 treats the amplified signal with reference to the detection control signal "c" (FIG. 4c) issued from the detection control signal generating circuit 13. Denoted by numeral 15 is a filter circuit, 16 is a voltage detecting circuit and 17 is an indicating circuit. The signal "d" (FIG. 4d) treated by the detecting circuit 14 is smoothed by the filter circuit 15, then detected by the voltage detecting circuit 16 and thereafter treated by the indicating circuit 17 to indicate the amount of the liquid in the container.

The induction type liquid level detecting device 10A will be described in detail below.

As will be seen from FIG. 3, the device 10A comprises generally the first coil 122 (exciting coil) wound on an elongate core 121 (which will be referred to as a first coil bobbin, hereinafter), a second coil 124 wound on a hollow plastic case 123 (which will be referred to as a second coil bobbin, hereinafter) within which the first coil 122 and thus the first coil bobbin 121 are coaxially housed, and a short circuit ring 126 of coil mounted to a float 125. The float 125 is arranged to move smoothly upward and downward in response to the rise and fall of the liquid level in the liquid container. For achieving the smooth movement of the float 125 relative to the coil-carrying second coil bobbin 123, the float 125 has a guide bore (no numeral) through which the second coil bobbin 123 passes with an adequate clearance therebetween.

As will be understood from FIG. 2, the first coil 122 comprises an upper (or first) coil section 1221 the winding density of which is gradually decreased from the top portion of the first coil bobbin 121 to the middle portion of the same, and a lower (or second) coil section 1222 the winding density of which is gradually increased from the middle portion of the first coil bobbin 121 to the lower portion of the same. If desired, the winding of the coil sections on the bobbin may be made stepwisely or linearly so long as the winding density inclination is established. These two coil sections 221 and 1222 are so arranged as to generate, upon electric energization, respective magnetic fluxes which advance in mutually opposed directions. For achieving this, the lower end of the first coil section 1221 is connected to the lower end of the second coil section 1222, as shown. The upper end of the second coil section 1222 is earthed. The upper end of the first coil 122 is connected to the AC signal source 11.

The second coil 124 (measuring coil) is thus magnetically coupled with the first coil 122. The winding density of the coil 124 is even throughout the axial length thereof as is seen from FIG. 2.

Figure 3:
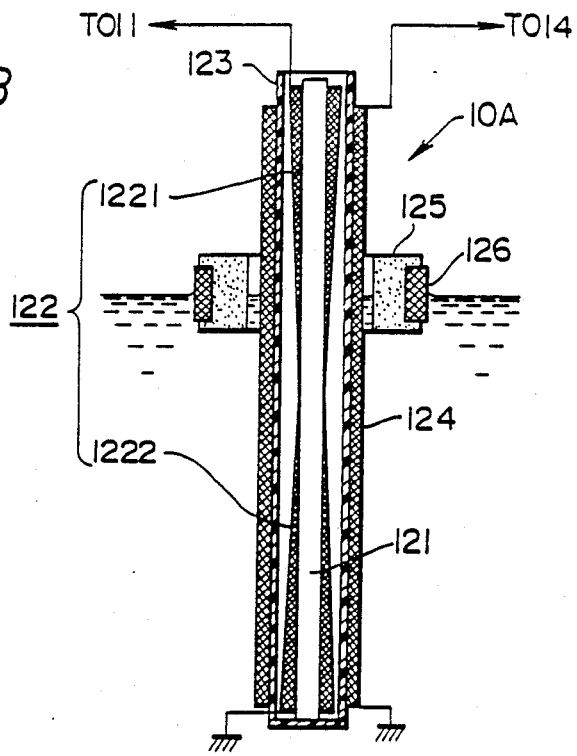
FIG. 3 is a sectional view of the liquid level detecting device of the first embodiment.

As will be seen from FIG. 3, the short circuit ring 126 on the float 125 is coaxially arranged with respect to the common axis of the first and second coils 122 and 124, establishing a magnetical coupling with these coils 122 and 124.

In the following, operation of the induction type liquid level detecting device 10A will be described with reference to FIG. 4.

For ease of understanding, let us suppose that the first coil 122 serving as an exciting coil comprises a series of small coils $L_1$, $L_2$ and $L_3$ of different number of turns (which series corresponds to the upper coil section 1221) and another series of small coils $L_1'$, $L_2'$ and $L_3'$ of different number of turns (which series corresponds to the lower coil section 1222), and let us suppose that the magnetic fluxes produced by these small coils $L_1$, $L_2$, $L_3$, $L_1'$, $L_2'$ and $L_3'$ are designated by $\phi_1$, $\phi_2$, $\phi_3$, $-\phi_1$, $-\phi_2$ and $-\phi_3$, respectively.

Figure 4:
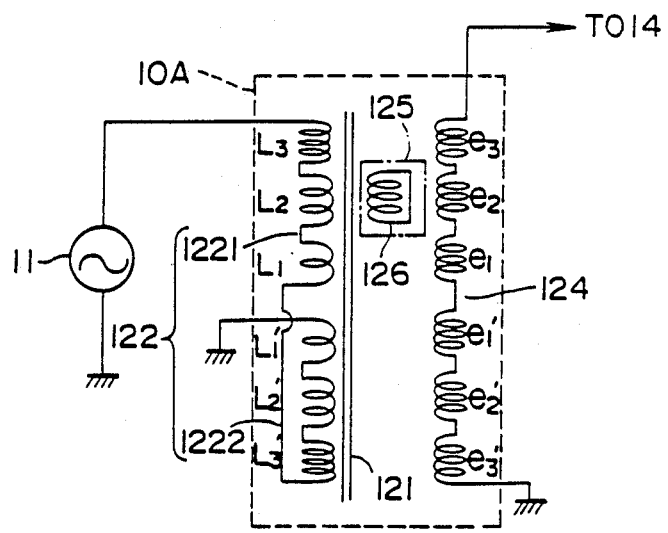
FIG. 4 is the circuit of the liquid level detecting device of the first embodiment with some portions symbolically illustrated.
Figure 5:
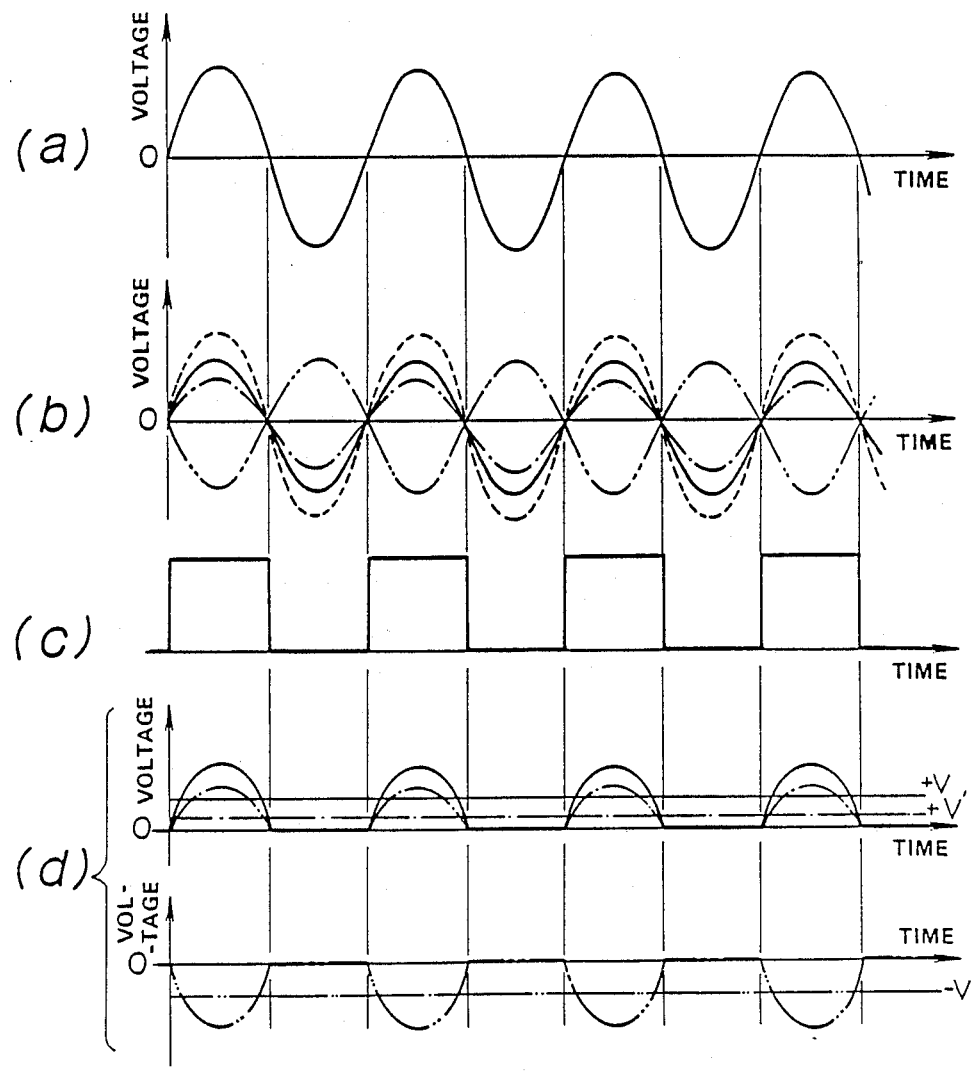
FIGS. 5a–d are a chart showing various signal forms appearing at given portions of the circuit of FIG. 2.

When, as is seen in FIG. 4, the short circuit ring 126 comes to a position facing the small coil $L_2$ of the upper coil section 1221 due to fluctuation of the liquid level in the container, the small coils (each having an equal number of turns) constituting the second coil 124 are forced to generate respective induced electromotive forces, which are:

$$e_3 = -n\frac{d\phi_3}{dt}, e_2 = 0, e_1 = -n\frac{d\phi_1}{dt}$$

$$e_3' = n\frac{d\phi_3}{dt}, e_2' = n\frac{d\phi_2}{dt}, e_1' = n\frac{d\phi_1}{d_t}$$

wherein: n: the number of turns of each coil.

Because the output of the second coil 124 is represented as a sum of the induced electromotive forces of these small coils, the output is represented by the next equation:

$$e = e_1 + e_2 + e_3 + e_1' + e_2' + e_3' = n\frac{d\phi_2}{dt}$$

As will be understood from this equation, when the short circuit ring 126 assumes the above-mentioned position, the magnetic energy of the small coil $L_2$ is consumed by the short circuit ring 126 thereby to prevent generation of magnetic flux of the small coil $L_2$ with a result that only the induced electromotive force $e_2'$ produced by the small coil $L_2'$ is outputted from the second coil 2. In this case, as is shown by a solid curved line in FIG. 5b, the electromotive force $e_2'$ has the same phase as the AC signal "a" (FIG. 5a) and has a crest value which corresponds to the liquid level then established.

It is to be noted that the signal wave forms illustrated by the dot-dash line and the broken line in FIG. 5b are presented for showing a fact that even when the short circuit ring 126 moves only within the range of the upper coil section 1221, the crest value of the induced electromotive force outputted from the second coil 124 changes depending on what magnetic flux of the upper coil section 1221 is shortened by the short circuit ring 126. It is further to be noted that the signal wave form illustrated by the dot-dot-dash line in FIG. 5b shows the induced electromotive force which is outputted from the second coil 124 when the short circuit ring 126 assumes a position within a range of the lower coil section 1222. As is seen from this wave form chart, the phase of the output (dot-dot-dash line) is reversed to that of the output produced when the short circuit ring 126 is located within the range of the upper coil section 1221.

As is understood from the foregoing description, the crest value of the output signal from the second coil 124 changes in accordance with the position of the short circuit ring 126, that is, in accordance with the liquid level in the liquid container. Furthermore, the phasic relation of the output signal from the second coil 124 to the AC signal "a" (FIG. 5a) changes by 180 degrees depending on whether the short circuit ring 126 is within the range of the upper coil section 1221 or the lower coil section 1222.

Figure 6:
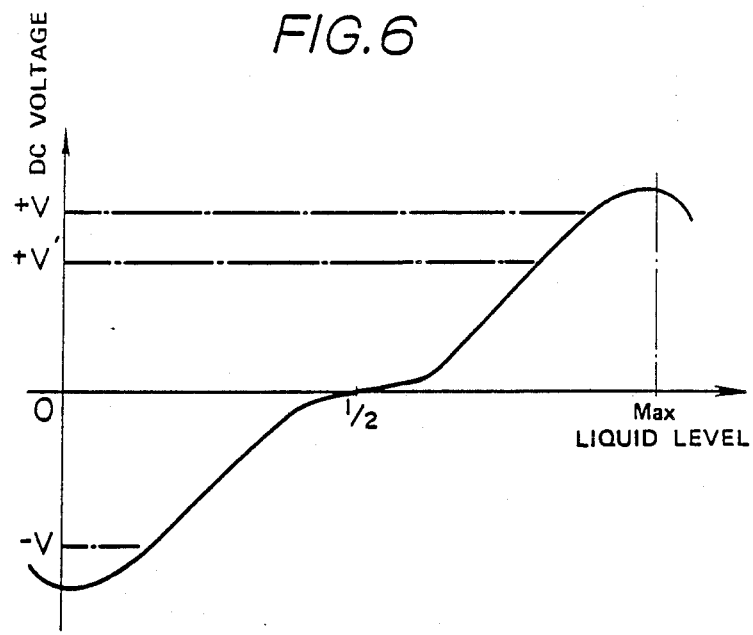
FIG. 6 is a graph showing the characteristic of output of the liquid level detecting device of the first embodiment.

The induced electromotive force outputted from the second coil 124 is detected by the detecting circuit 14 on the basis of the detection control signal "c" (FIG. 5c) outputted from the detection control signal generating circuit 13, and from the detecting circuit 14, there is outputted a voltage signal "d" with the characteristic as shown by FIG. 5d. The voltage signal "d" is applied to the smoothing circuit 15 to be smoothed (see the flat voltage lines designated by $+V$, $+V'$ and $-V$ in FIG. 5d). Due to the above-mentioned unique arrangement of the first coil 122, the DC voltage thus outputted from the smoothing circuit 15 shows such the characteristic as shown in FIG. 6 which shows the output voltage relative to the position of the liquid level. The value of the DC voltage is read by the voltage detecting circuit 16 and treated by the indicating circuit 17 to indicate the amount of the liquid in the container.

Figure 27:
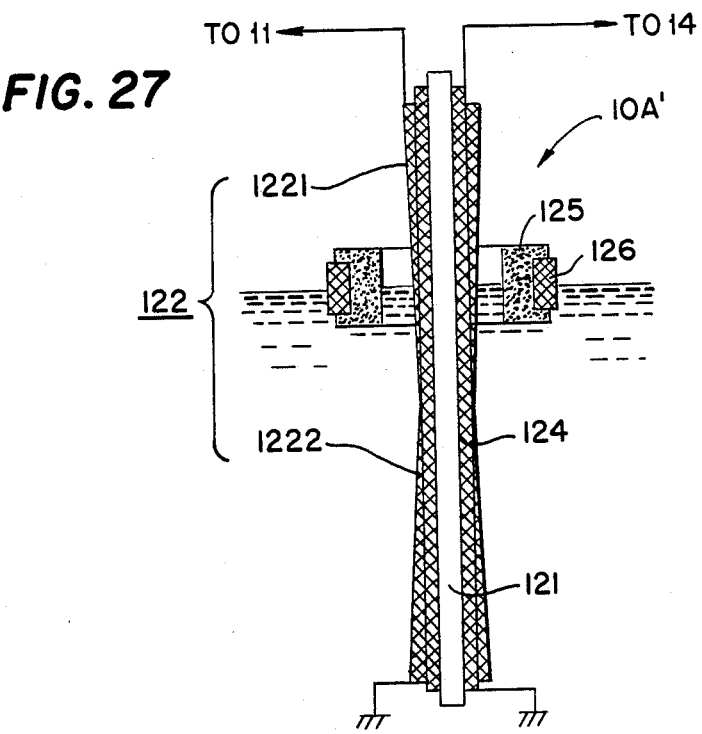
FIGS. 27 and 28 show modification of the coil arrangements of the first embodiment shown in FIG. 3.
Figure 28:
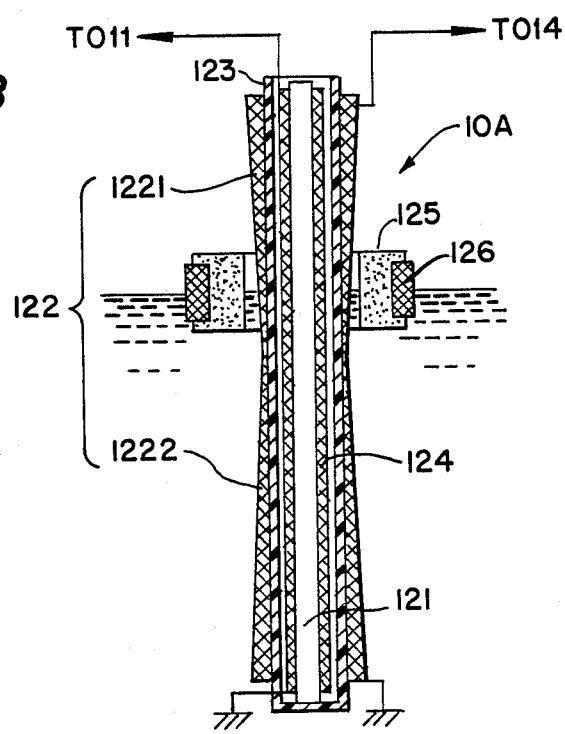

Although, in the first embodiment 10A, the second coil bobbin 123 is employed for winding thereon the second coil 124, the present invention is not limited to such an arrangement. That is, if desired, the second coil 124 may be wound directly on the first coil 122 without using the second coil bobbin. Furthermore, the positional relation between the first coil 122 and the second coil 124 may be reversed. That is, in this reversed arrangement, the second coil 124 is wound on the first coil bobbin 121 and the first coil 122 is wound on the second coil bobbin 123 in which the second coil 124 is installed. Examples of such modifications are shown in FIGS. 27 and 28.

Figure 7:
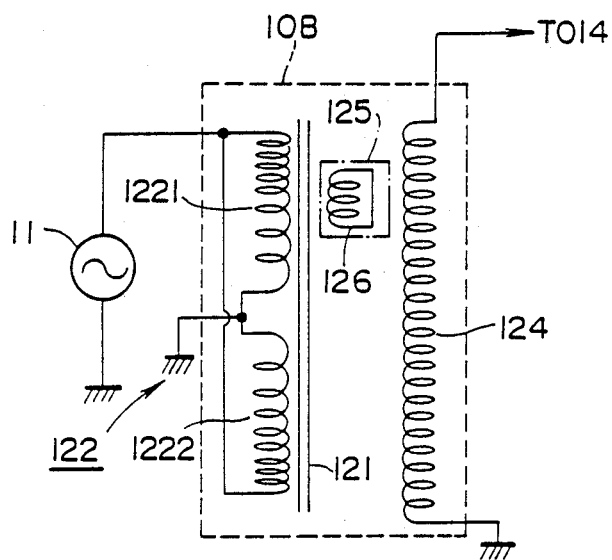
FIG. 7 is a diagramatically illustrated circuit of a liquid level detecting device of a second embodiment.

Referring to FIG. 7, there is shown a circuit of a liquid level detecting device of a second embodiment 10B of the present invention. In this second embodiment, unlike the case of the first embodiment, the upper and lower coil sections 1221 and 1222 are connected in parallel with each other. That is, the inside ends of the upper and lower coil sections 1221 and 1222 are connected and earthed. The parts identical to those of the first embodiment 10A are denoted by the same numerals in the drawing, and explanation of them will be omitted.

Figure 8:
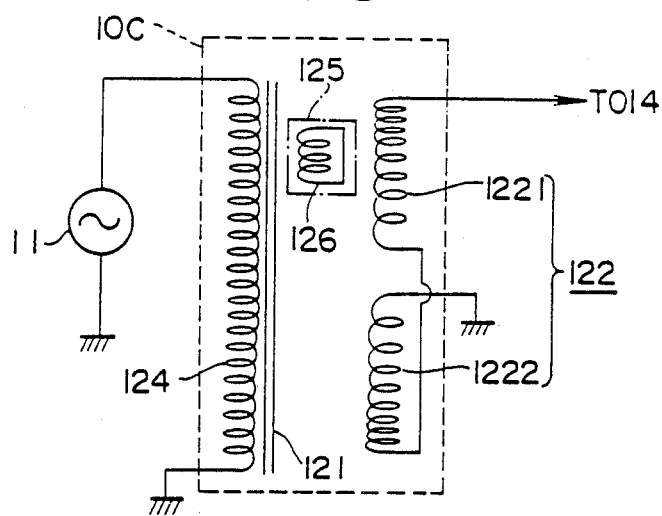
FIG. 8 is a view similar to FIG. 7, but showing a third embodiment.

Referring to FIG. 8, there is shown a circuit of a liquid level detecting device 10C of a third embodiment of the invention. As will be seen from this drawing, the exciting coil connected to the AC signal source 11 is a coil identical to the second coil 124 of the first embodiment 10A, while the measuring coil is a coil identical to the first coil 122 of the first embodiment.

Figure 9:
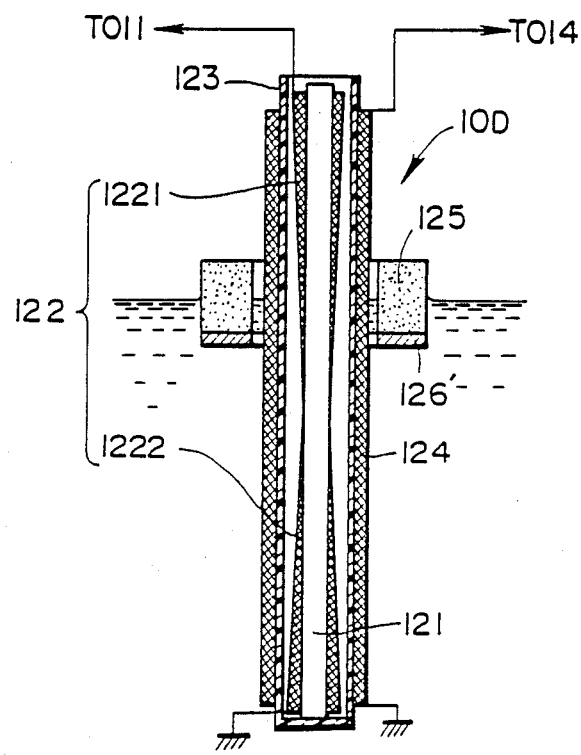
FIG. 9 is a view similar to FIG. 3, but showing a fourth embodiment.

Referring to FIG. 9, there is shown a liquid level detecting device 10D of a fourth embodiment of the invention. In this embodiment, a metal ring 126' constructed of for example aluminium or the like is used in place of the short circuit ring 126 of coil employed in the above-mentioned embodiments. The metal ring 126' consumes the magnetic energy on the principle of eddy-current loss. As the short circuit ring 126, a ring constructed of magnetic powder-impregnated plastic is also usable.

Figure 10:
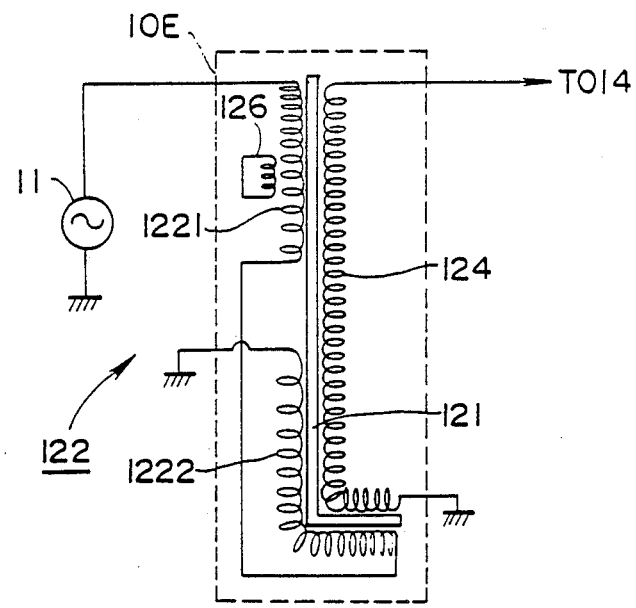
FIG. 10 is a view similar to FIG. 7, but showing a fifth embodiment.
Figure 11:
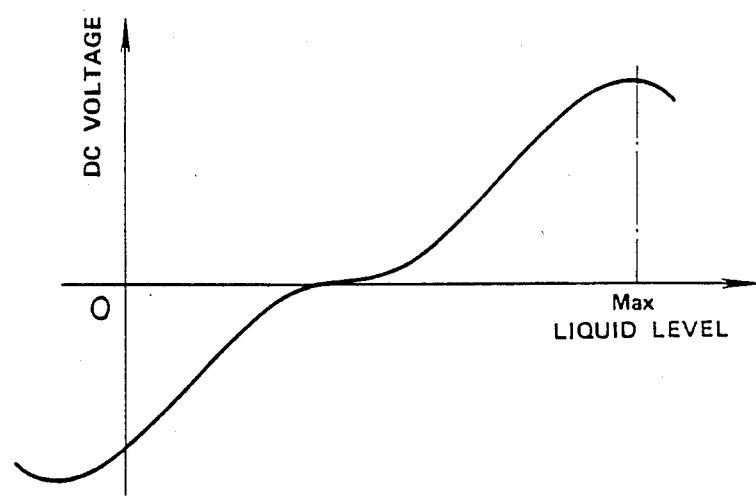
FIG. 11 is a graph showing the characteristic of output of the device of the fifth embodiment.

Referring to FIG. 10, there is shown a circuit of a liquid level detecting device 10E of a fifth embodiment of the invention. In this embodiment, the lower portion of the device is bent as shown. With this, the output from the smoothing circuit 15 shows the characteristic as shown in the graph of FIG. 11. That is, the left section of the output characteristic curve at which the changing rate of output is quite small can be deleted, so that the detecting ability of the device at the time when the liquid is small is improved.

Figure 12:
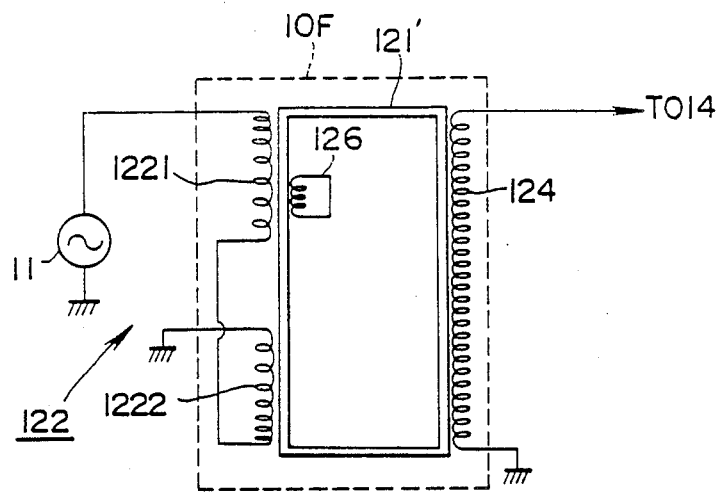
FIG. 12 is a view similar to FIG. 7, but showing a sixth embodiment.
Figure 13:
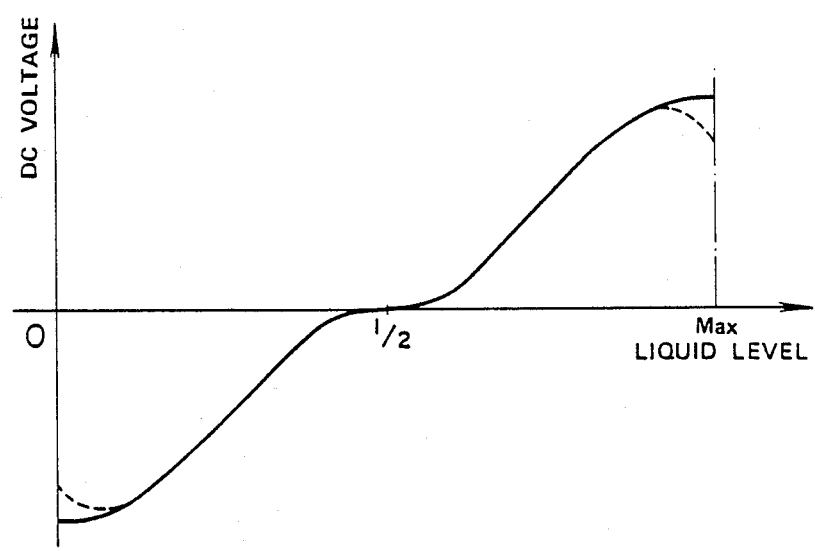
FIG. 13 is a graph showing the characteristic of output of the device of the sixth embodiment.

Referring to FIG. 12, there is shown a circuit of a liquid level detecting device 10F of a sixth embodiment of the invention. In this embodiment, a rectangular frame-like core 121' is employed. The first coil 122 (that is, exciting coil) is wound on one bobbin portion of the core 121' and the second coil 124 (that is, measuring coil) is wound on the other bobbin portion to establish a closed magnetic circuit. With this arrangement, it is possible to solve a rapid fluctuation of the magnetic field which would occur, due to permeability, at the extreme ends of the detecting range. Thus, as is shown by the graph of FIG. 13, the curve of the output characteristic shows at both ends of the detecting range such characteristic as shown by the solid lines. That is, undesirable U-turn phenomenon depicted by the broken lines can be solved. Thus, in the sixth embodiment, wider detecting range is provided as compared with the first embodiment.

Figure 14:
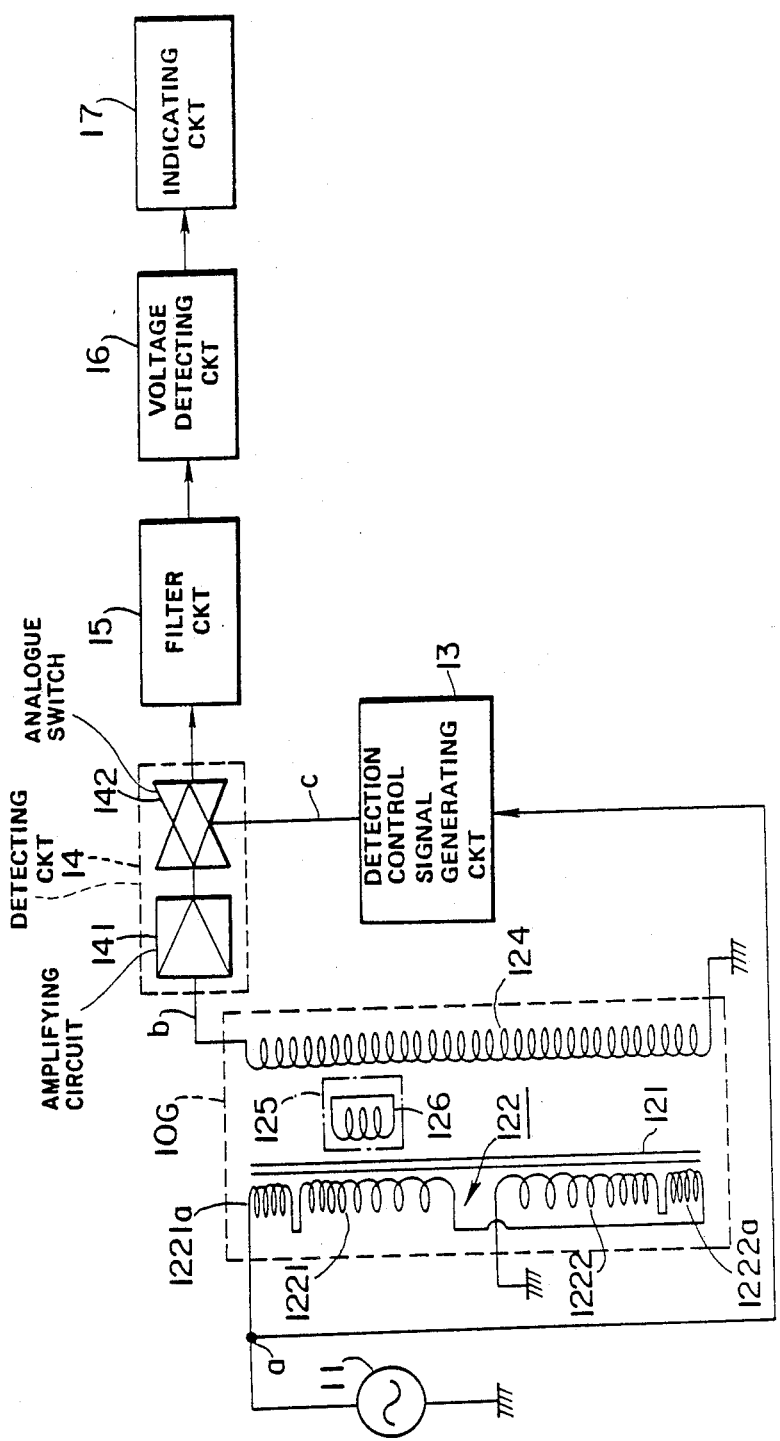
FIG. 14 is a view similar to FIG. 2, but showing a seventh embodiment of the present invention.
Figure 15:
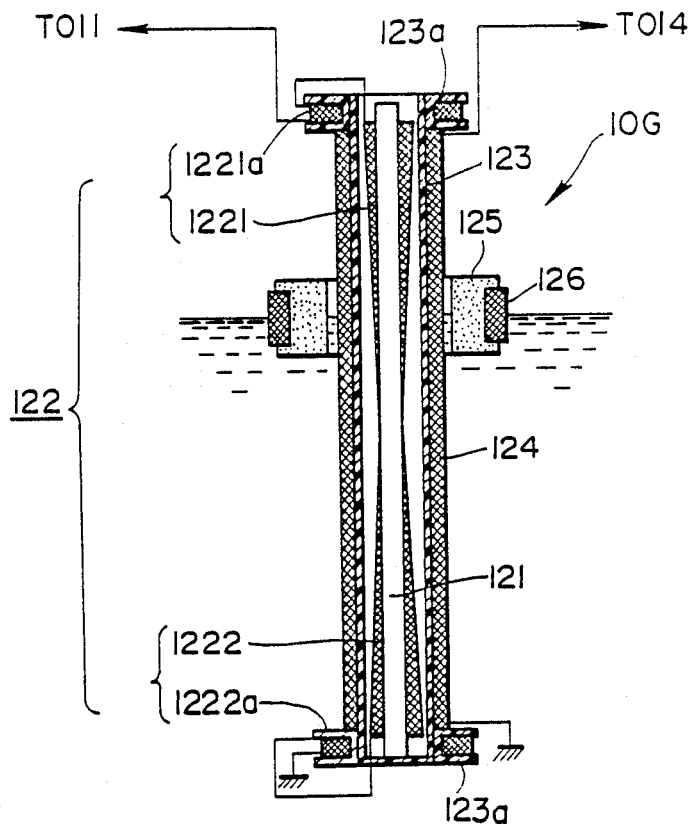
FIG. 15 is a sectional view of a liquid level detecting device of the seventh embodiment.

Referring to FIGS. 14 and 15, there is shown a liquid level detecting device 10G of a seventh embodiment. This device 12G is substantially the same as that of the first embodiment 10A except for several parts which will be described hereinafter. Thus, the substantially same parts as those of the first embodiment 10A will be denoted by the same numerals and detailed description of them will be omitted. In the seventh embodiment, two additional coils 1221a and 1222a of increased number of turns are further employed, one being connected to the upper end of the upper coil section 1221 and the other being connected to the lower end of the lower coil section 1222. As is understood from FIG. 14, the winding direction of each additional coil 1221a or 1222a is equal to hat of the associated coil section 1221 or 1222. As is seen from FIG. 15, these additional coils 1221a and 1222a are housed in upper and lower extensions 123a of the second coil bobbin 23, respectively. Preferably, the extensions are formed to have grooves, as shown.

Figure 16:
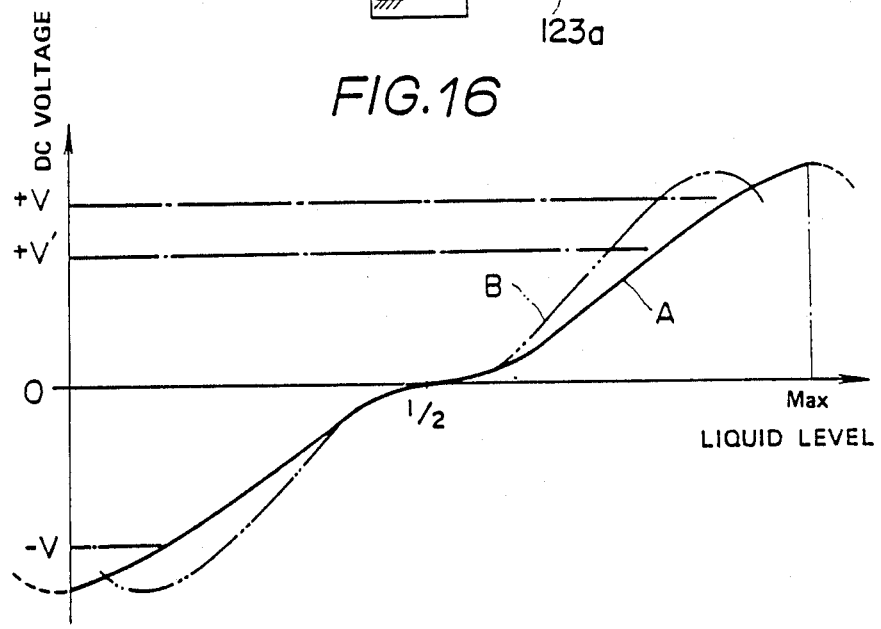
FIG. 16 is a graph showing the characteristic of output of the device of the seventh embodiment.

Because of the provision of the additional coils 1221a and 1222a, the output from the smoothing circuit 15 has such a characteristic as shown by the solid curve in FIG. 16. For comparison, the output curve of the first embodiment 10A is also shown by dot-dot-dash line. As is understood from these curves, the detecting range of the seventh embodiment 10G is wider than that of the first embodiment 10A.

Figure 17:
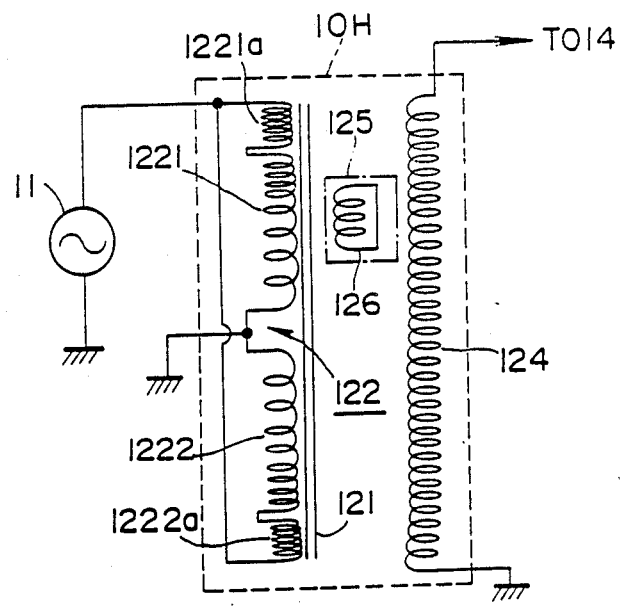
FIG. 17 is a view similar to FIG. 7, but showing an eighth embodiment of the invention.

Referring to FIG. 17, there is shown an eighth embodiment 10H of the invention, which is substantially the same as the second embodiment 10B (see FIG. 7) except for the two additional coils 1221a and 1222a. That is, in the eighth embodiment 10H, the additional coils 1221a and 1222a are connected to the upper and lower coil sections 1221 and 1222 of the first coil 122 in the same manner as the seventh embodiment 10G.

Figure 18:
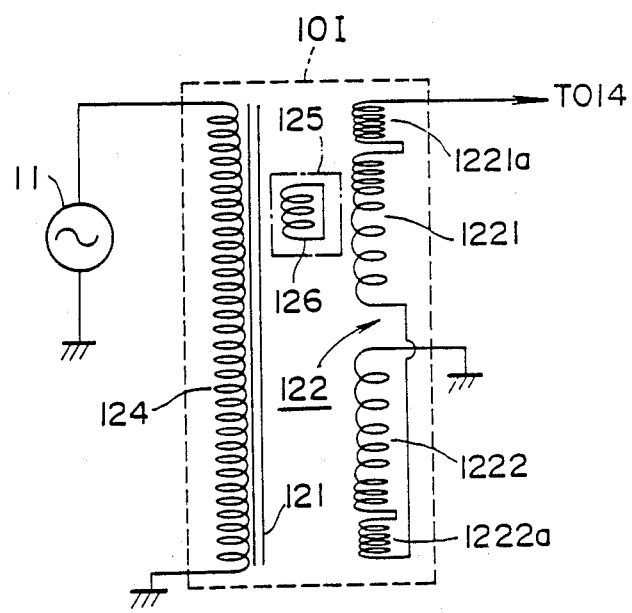
FIG. 18 is a view similar to FIG. 7, but showing a ninth embodiment.

Referring to FIG. 18, there is shown a ninth embodiment 10I of the invention, which is substantially the same as the third embodiment 10C (see FIG. 8) except for the two additional coils 1221a and 1222a. As is understood from the drawing, in the ninth embodiment, the two additional coils 1221a and 1222a are connected to the upper and lower coil sections 1221 and 1222 of the measuring coil.

Figure 19:
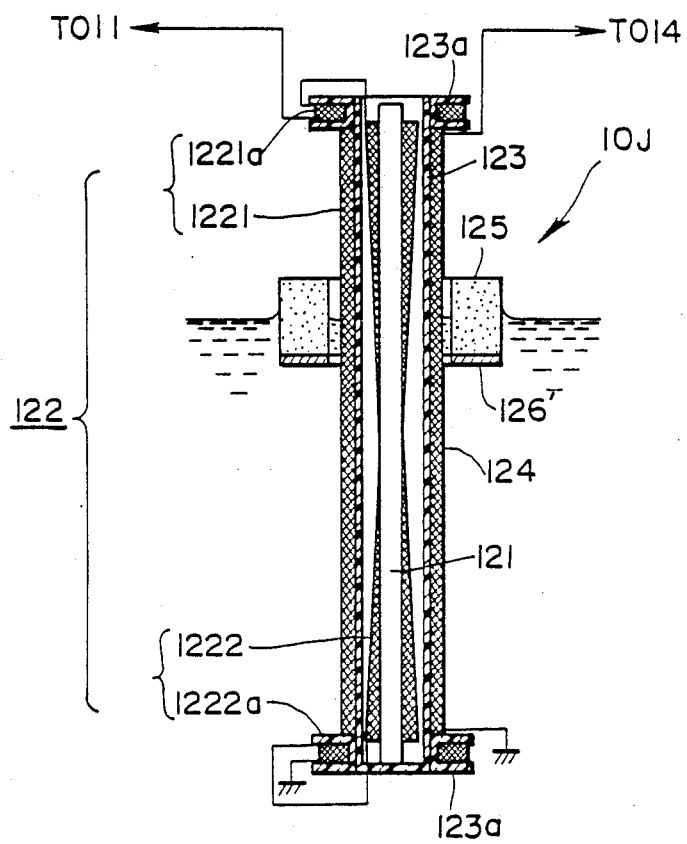
FIG. 19 is a view similar to FIG. 15, but showing a tenth embodiment of the invention.
Figure 29:
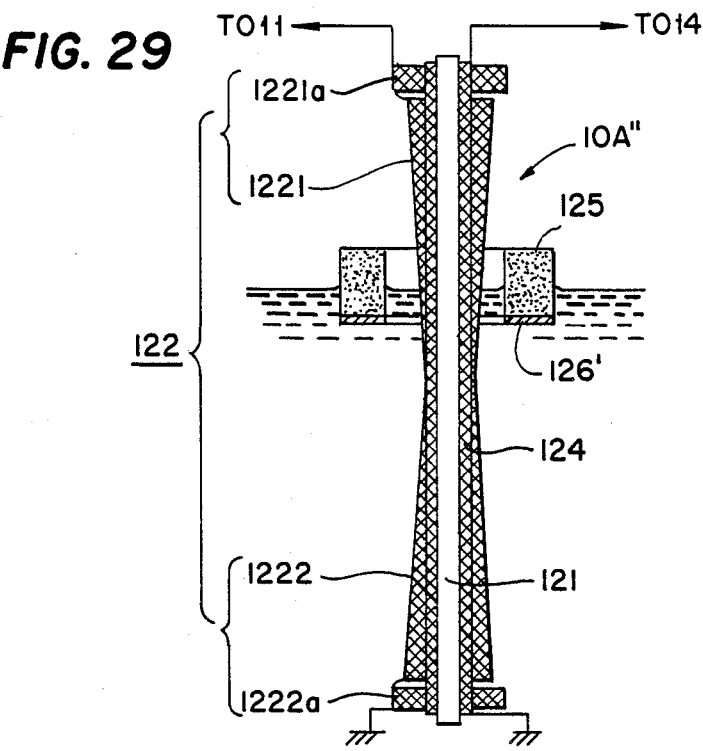
FIGS. 29 and 30 show modification of the coil arrangements of the tenth embodiment shown in FIG. 19.
Figure 30:
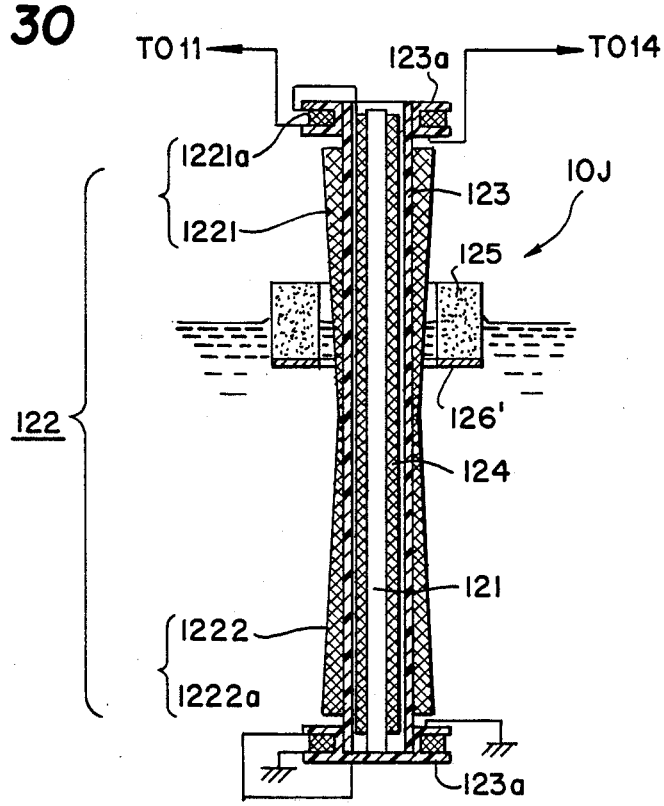

Referring to FIG. 19, there is shown a tenth embodiment 10J of the invention, which is substantially the same as the fourth embodiment 10D of FIG. 9 except for the two additional coils 1221a and 1222a connected to the exciting coil 122. The coil arrangements may also be modified, as previously discussed, as shown in FIGS. 29 and 30.

Figure 20:
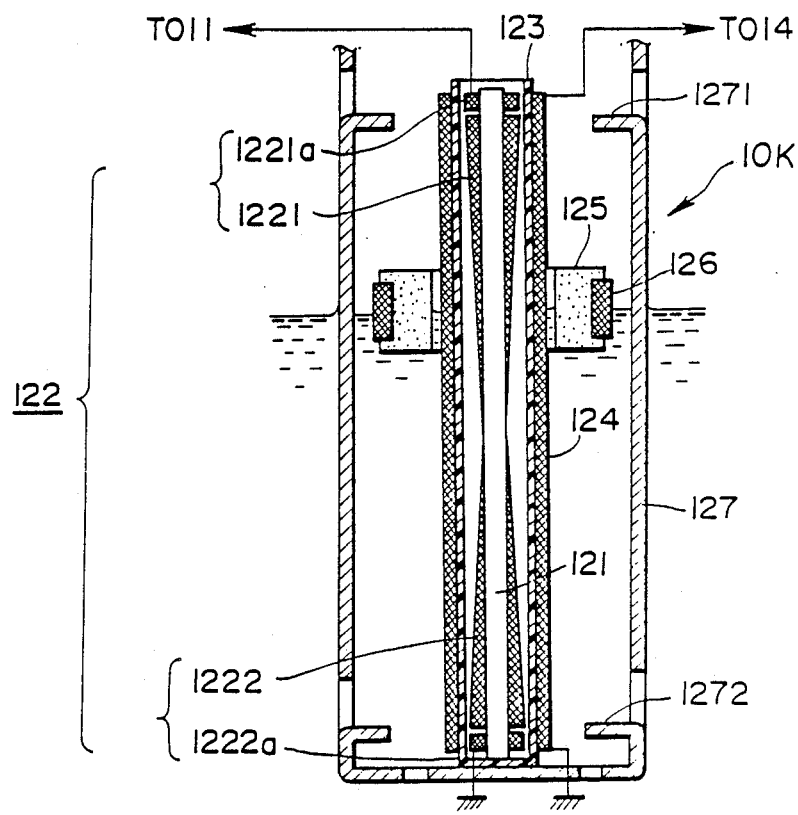
FIG. 20 is a view similar to FIG. 19, but showing an eleventh embodiment of the invention.

Referring to FIG. 20, there is shown an eleventh embodiment 10K of the invention, which is a modification of the tenth embodiment 10J. That is, in the eleventh embodiment, a cylindrical case 127 is employed for receiving therein a detector proper which is substantially identical to the device of the tenth embodiment 10J. The case 127 is formed with a suitable number of holes (no numerals) for, when mounted in a liquid container, providing a fluid communication between the interior of the case 127 and the exterior of the same. The case 127 is formed with upper and lower stoppers 1271 and 1272 for suppressing extreme movement of the float 125.

Figure 21:
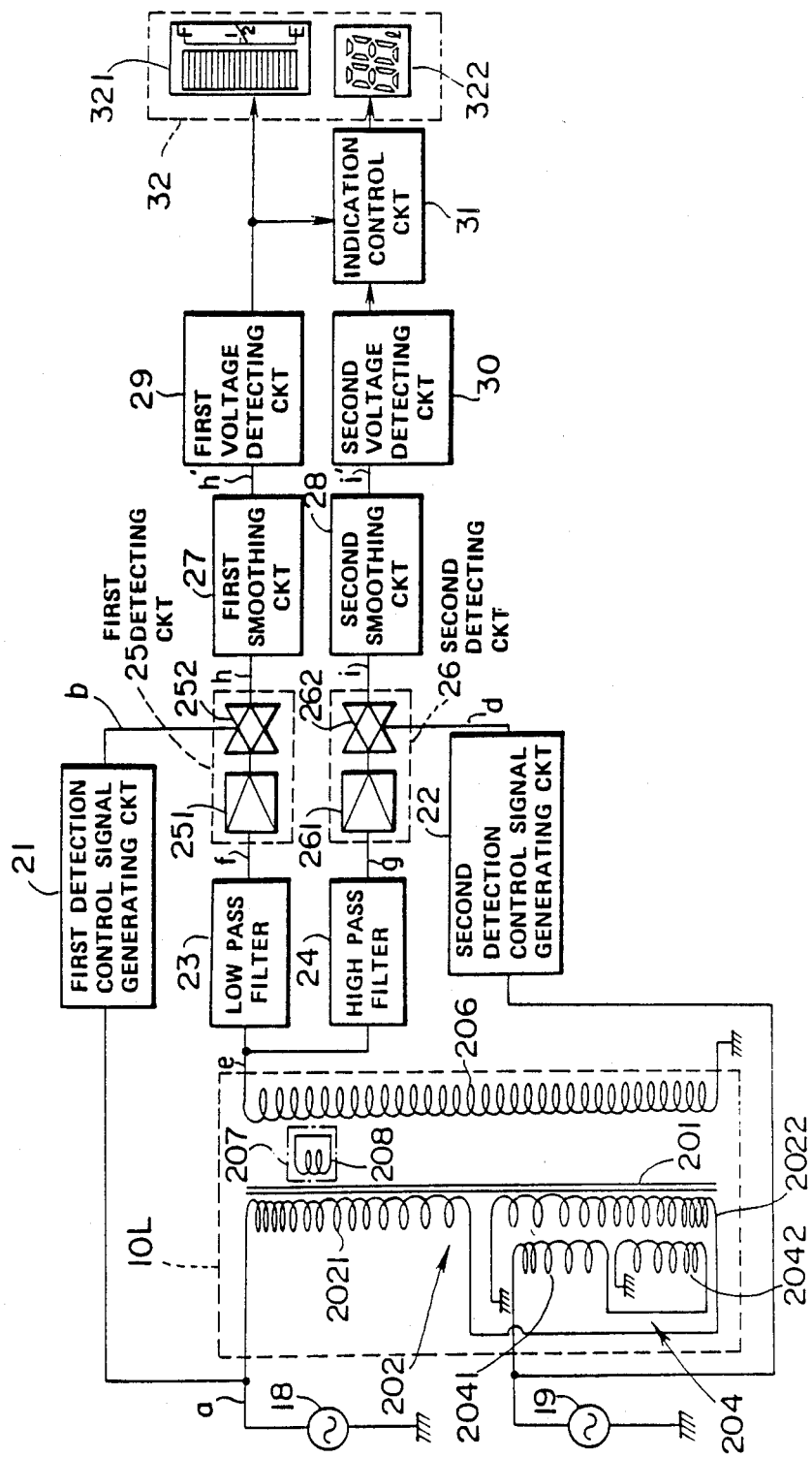
FIG. 21 is a view similar to FIG. 2, but showing a twelfth embodiment of the invention.
Figure 22:
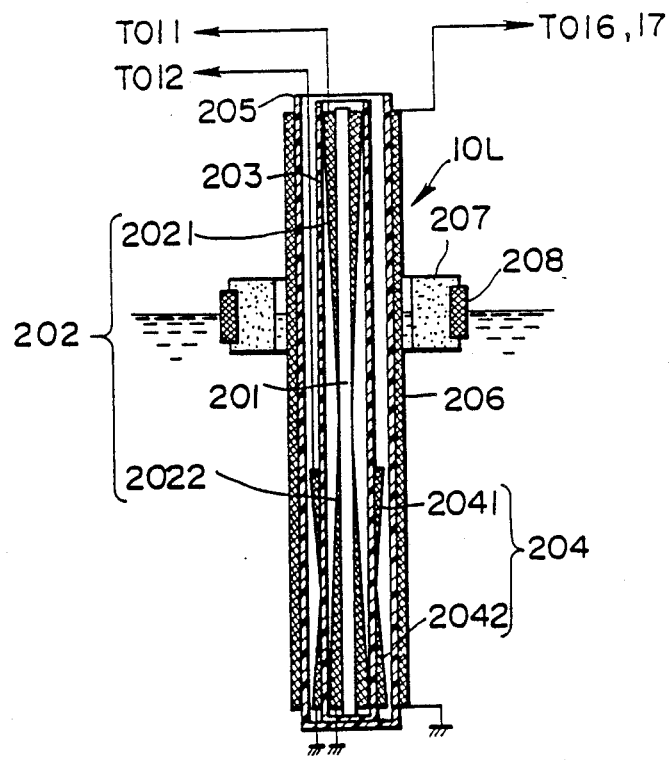
FIG. 22 is a sectional view of a liquid level detecting device of the twelfth embodiment.

Referring to FIGS. 21 and 22, there is shown an induction type liquid level detecting device 10L of a twelfth embodiment of the invention.

Figure 24:
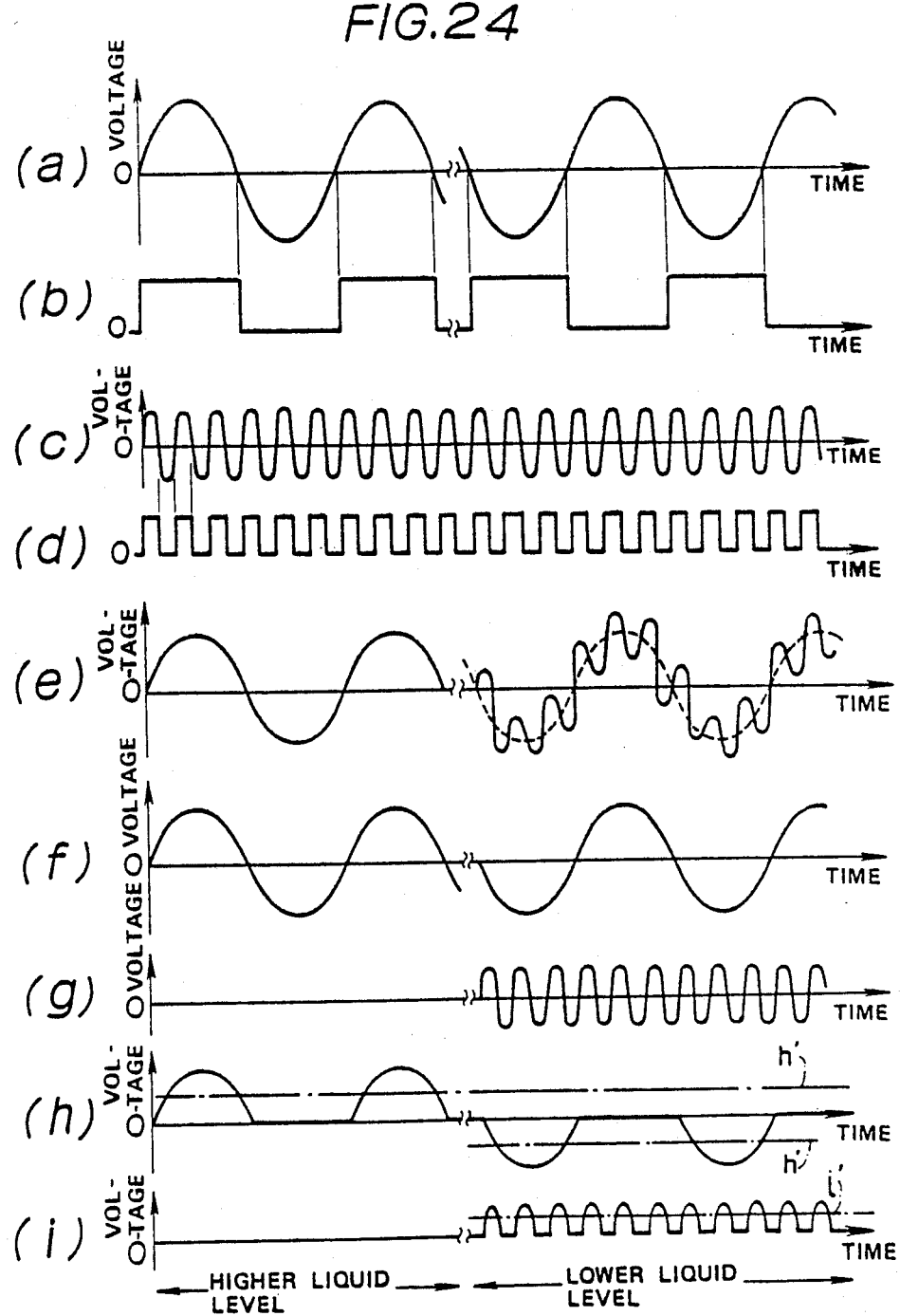
FIGS. 24a–i are a chart showing various signal wave forms appearing at given portions of the circuit of FIG. 21.

In FIG. 21, denoted by numeral 18 is a first AC signal source and 19 is a second AC signal source. The first AC signal source 18 supplies both a main exciting coil 202 (or first coil) of the induction type liquid detecting device 10L and a first detection control signal generating circuit 21 with an AC signal "a" as shown in FIG. 24a. The second AC signal source 19 supplies both an auxiliary exciting coil 204 (or third coil) of the device 10L and a second detection control signal generating circuit 22 with an AC signal "c" as shown in FIG. 24c. It is to be noted that the frequencies of the AC signals "a" and "c" are so determined that elements (such as operational amplifier or the like) constituting after-mentioned amplifying circuits 251 and 261 can exhibit their normal performances. More particularly, the frequencies can be determined to low levels so long as an undesirable resonance phenomenon due to stray capacitance is avoided. In the disclosed twelfth embodiment 10L, the frequency of the AC signal "a" is set at 1 KHz, while the frequency of the AC signal "c" is set at 6 KHz. By receiving the AC signal "a", the first detection control signal generating circuit 21 issues a pulse signal "b" (FIG. 24b) of detection control which is synchronous with the AC signal "a" (FIG. 24a). By receiving the AC signal "c" (FIG. 24c), the second detection control signal generating circuit 22 issues a pulse signal "d" (FIG. 24d) of detection control which is synchronous with the AC signal "c". Denoted by numeral 23 is a low-pass filter which receives an output signal "e" (shown in FIG. 24e) from the device proper 10L and deletes from the signal "e" a high frequency component corresponding to the AC signal "c". Thus, a signal "f" having such characteristic as shown in FIG. 24f is outputted from the low-pass filter 23. Denoted by numeral 24 is a high-pass filter which receives the output signal "e" of the device proper 10L and deletes from the signal "e" a low frequency component corresponding to the AC signal "a". Thus, a signal "g" having such a characteristic as shown in FIG. 24g is outputted from the high-pass filter 24. Denoted by numeral 25 is a first detection circuit which comprises an amplifying circuit 251 for suitably amplifying the output signal "f" from the low-pass filter 23 and an analogue switch 252 for detecting the amplified output signal "f" in accordance with the detection control signal "b" issued from the first detection control signal generating circuit 21. Denoted by numeral 26 is a second detection circuit which comprises an amplifying circuit 261 for suitably amplifying the output signal "g" from the high-pass filter 24 and an analogue switch 262 for detecting the amplified output signal "g" in accordance with the detection control signal "d" issued from the second detection control signal generating circuit 22. Denoted by numerals 27 and 28 are first and second smoothing circuits which respectively smooth the output signal "h" (see FIG. 24h) from the first detection circuit 25 and the output signal "i" (see FIG. 24i) from the second detection circuit 26.

Figure 23:
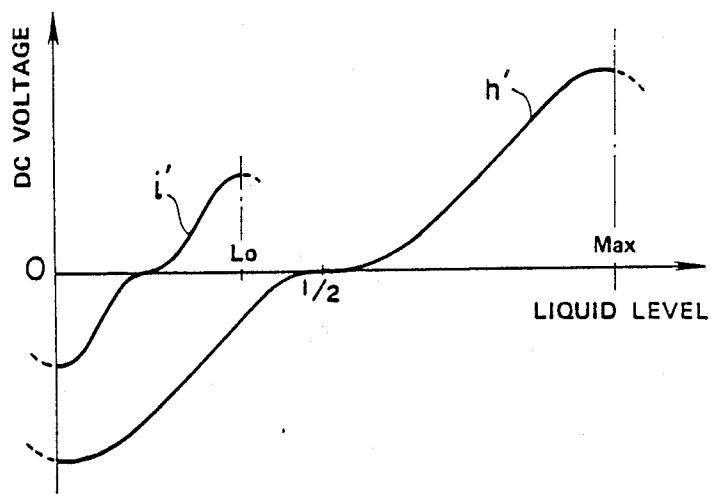
FIG. 23 is a graph showing the characteristic of output of the device of the twelfth embodiment.

Denoted by numerals 29 and 30 are first and second voltage detecting circuits. The first voltage detecting circuit 29 detects the value of the DC voltage signal "h'" (see the line h' in FIG. 24h) outputted from the first smoothing circuit 27, while the second voltage detecting circuit 30 detects the value of the DC voltage signal "i'" (see the line i' in FIG. 24i) outputted from the second smoothing circuit 28. Denoted by numeral 31 is an indication control circuit which permits transmission of output of the second voltage detecting circuit 30 to an after-mentioned secondary indicator 322 only when the voltage value of the voltage signal "h'" from the first smoothing circuit 27 is lower than a predetermined value corresponding to the upper limit (see the point $L_o$ in the graph of FIG. 23) of liquid level detecting range which is determined when the associated liquid container contains small amount of liquid therein. That is, only when the voltage value of the voltage signal "h'" is lower than the predetermined value, the voltage value of the voltage signal "i'" from the second smoothing circuit 28 is treated by the secondary indicator 322. Denoted by numeral 32 is a double function indicator which comprises a primary indicator 321 for representing in bar-graphical fashion the output data (viz., the voltage of the voltage signal "h'") issued from the first voltage detection circuit 29 and the above-mentioned secondary indicator 322 for representing in digital fashion the output data (viz., the voltage of the voltage signal "i'") issued from the second voltage detection circuit 30 through the indication control circuit 31.

In the following, the induction type liquid level detecting device 10L will be described in detail.

As will be seen from FIGS. 21 and 22, the device 10L comprises generally the primary exciting coil (or first coil) 202 wound on a first coil bobbin 201, an auxiliary exciting coil (or third coil) 204 wound on a hollow plastic inner case (or third coil bobbin) 203 (see FIG. 22) in which the primary exciting coil 202 is coaxially disposed, a measuring coil (or second coil) 206 wound on a hollow plastic outer case (second coil bobbin) 205 (see FIG. 22) in which the auxiliary exciting coil 204 is coaxially disposed, and a short circuit ring 208 of coil fixed to a float 207 which moves upward and downward in response to the rise and fall of liquid level in the liquid container.

The primary exciting coil 202 has a length sufficiently enough for covering the liquid level detecting range and comprises upper and lower coil sections (or first and second coil sections) 2021 and 2022 which are connected in series and wound on the first coil bobbin 201 extending vertically. Similar to the afore-mentioned embodiments, the winding density of the upper coil section 2021 is gradually decreased from the upper portion of the first coil bobbin 201 to the middle portion of the same, and the winding density of the lower coil section 2022 is gradually increased from the middle portion of the bobbin 201 to the lower portion of the same. The upper and lower coil sections 2021 and 2022 are so arranged as to generate, upon electric energization, respective magnetic fluxes which advance in the mutually opposed directions. The primary exciting coil 202 is connected to the first AC signal source 18.

The auxiliary exciting coil 204 has a length of about one third of that of the primary exciting coil 202 and is wound on a lower portion of the third coil bobbin 203 (see FIG. 22). The auxiliary exciting coil 204 comprises upper and lower coil sections (or third and fourth coil sections) 2041 and 2042 which are connected in series. Similar to the primary exciting coil 202, the winding density of the upper coil section 2041 is gradually decreased from the upper end of the auxiliary exciting coil 204 to the middle portion of the same, and the winding density of the lower coil section 2042 is gradually increased from the middle portion of the auxiliary exciting coil 204 to the lower end of the same. The upper and lower coil sections 2041 and 2042 are so arranged as to generate, upon electric energization, respective magnetic fluxes which advance in the mutually opposed directions. The auxiliary exciting coil 204 is connected to the second AC signal source 19.

The measuring coil 206 has a length substantially equal to the primary exciting coil 202 and is wound on the second coil bobbin 205. The winding density of the measuring coil 206 is even throughout the length thereof, as is understood from FIG. 21. Thus, the measuring coil 206 is magnetically coupled with both the primary and auxiliary exciting coils 202 and 204.

As is seen from FIG. 22, the short circuit ring 208 is coaxially disposed on the float 207 which is movable along the length of the second coil bobbin 205 in response to the fluctuation of the liquid level in the container. Thus, between the short circuit ring 208 and each of the primary exciting coil 202, the auxiliary exciting coil 204 and the measuring coil 206, there is established a magnetic coupling.

In the following, operation of the liquid level detecting device 10L having the above-mentioned arrangement will be described.

First, the description will be commenced with respect to a condition wherein the liquid level is relatively high, that is, the container contains a large amount of liquid therein. In this condition, the short circuit ring 208 assumes a position to face a part of the upper coil section 2021 of the primary exciting coil 202, as is shown in FIGS. 21 and 22. Thus, for the reason which has been explained in the first embodiment 10A, only the magnetic flux generated by a part of the lower coil section 2022 (viz., a counterpart of the part of the upper coil section 2022 to which the short circuit ring 208 faces) works to make the measuring coil 206 output the induced electromotive force. It is to be noted that, in this condition, the auxiliary exciting coil 204 does not take part in generation of the induced electromotive force due to absence of the short circuit ring 208. Accordingly, when the liquid level in the liquid container is relatively high, the measuring coil 206 outputs an induced electromotive force of the characteristic as depicted by the left-half of the wave-form shown in FIG. 24e. That is, the induced electromotive force has a phase equal to that of the AC signal "a" issued from the first AC signal source 18 and has a crest value determined in accordance with the distance from the middle portion of the primary exciting coil 202 to the liquid level in the liquid container.

Second, the description will be directed to a condition wherein the liquid level is relatively low, that is, the container contains only a small amount of liquid therein. In this condition, the short ring 208 assumes a position to face both the lower coil section 2022 of the primary exciting coil 202 and the auxiliary exciting coil 204. Thus, a magnetic flux generated by a part of the upper coil section 2021 (viz., a counterpart of the part of the lower coil section 2022 to which the short circuit ring 208 faces) of the primary exciting coil 202 and another magnetic flux generated by either one of upper and lower coil sections 2041 and 2042 work to make the measuring coil 206 output the induced electromotive force. Accordingly, when the liquid level in the liquid container is relatively low, the measuring coil 206 outputs an induced electromotive force of the characteristic as depicted by the right-half of the wave-form shown in FIG. 24e. That is, the induced electromotive force thus generated is a sum of the induced electromotive force which has a phase equal to that of the AC signal "a" issued from the AC signal source 18 and has a crest value determined in accordance with the distance from the middle portion of the primary exciting coil 202 to the liquid level in the liquid container and the other induced electromotive force which has a phase equal to that of the AC signal "c" issued from the second AC signal source 19 and has a crest value determined in accordance with the distance from the middle portion of the auxiliary exciting coil 204 (that is, the middle portion defined between the upper and lower coil sections 2041 and 2042) to the liquid level in the liquid container.

The induced electromotive force "e" (see FIG. 24e) thus outputted from the measuring coil 206 is applied to the low-pass filter 23 and the high-pass filter 24. As is seen from the graph of FIG. 24f, upon receiving the force "e", the low-pass filer 23 outputs a voltage signal "f" the phase of which is synchronous with that of the AC signal "a" from the first AC signal source 18 and the crest value of which is determined in accordance with the liquid level in the liquid container. (It is to be noted that the phasic relation of the voltage signal "f" relative to the AC signal "a" changes by 180 degrees depending on whether the short circuit ring 208 is within the range of the upper coil section 2021 or the lower coil section 2022. While, the high-pass filter 24 outputs, only when the liquid level is low, a voltage signal "g" (see FIG. 24g) the phase of which is synchronous with that of the AC signal "c" from the second AC signal source 19 and the crest value of which is determined in accordance with the liquid level in the liquid container. (It is to be noted that the phasic relation of the voltage signal "f" to the AC signal "c" changes by 180 degrees depending on whether the short circuit ring 208 is within the upper coil section 2041 of the auxiliary exciting coil 204 or the lower coil section 2042 of the same.

The voltage signal "f" from the low-pass filter 23 is treated by the first detection circuit 25 in accordance with the detection control signal "b" (see FIG. 24b) issued from the first detection control signal generating circuit 21. Thus, a voltage signal "h" having a wave form shown by FIG. 24h is outputted from the first detection circuit 25. The output signal "h" is fed to the first smoothing circuit 27 to be smoothed (see the lines "h'" in FIG. 24h). The DC voltage "h'" thus outputted from the smoothing circuit 27 has such a characteristic is shown by the curve "h'" of the graph in FIG. 23 due to the above-mentioned unique winding of the primary exciting coil 202. The value of the DC voltage "h'" is read by the first voltage detection circuit 29 and indicated in bar-graphic fashion by the primary indicator 321 of the double functioning indicator 32.

While, the voltage signal "g" from the high-pass filter 24 is treated by the second detection circuit 26 in accordance with the detection control signal "d" (see FIG. 24d) issued from the second detection control signal generating circuit 22. Thus, a voltage signal "i" having a wave form as shown by FIG. 24i is outputted from the second detection circuit 26. The output signal "i" is fed to the second smoothing circuit 28 to be smoothed (see the line "i'" in FIG. 24i). The DC voltage "i'" thus outputted from the smoothing circuit 28 has such a characteristic as shown by the curve "i'" of the graph in FIG. 23 due to the above-mentioned unique winding of the auxiliary exciting coil 204. The DC voltage "i'" is read by the second voltage detection circuit 30 and indicated in digital fashion by the secondary indicator 322 of the double functioning indicator 32.

Figure 25:
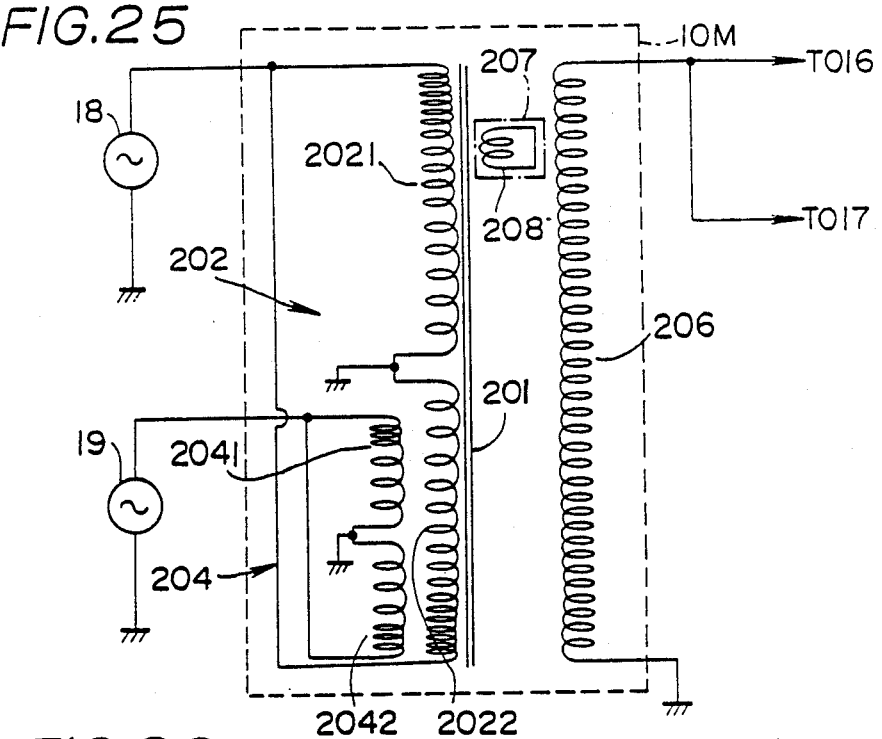
FIG. 25 is a circuit of a liquid level detecting device of a thirteenth embodiment of the invention.

Referring to FIG. 25, there is shown a circuit of a liquid level detecting device 10M of a thirteenth embodiment of the present invention. In this embodiment, unlike the case of the twelfth embodiment 10L, the upper and lower coil sections 2021 and 2022 of the primary exciting coil 202 are connected in parallel with each other, and the upper and lower coil sections 2041 and 2042 of the auxiliary exciting coil 204 are connected in parallel with each other, as shown in the drawing.

Figure 26:
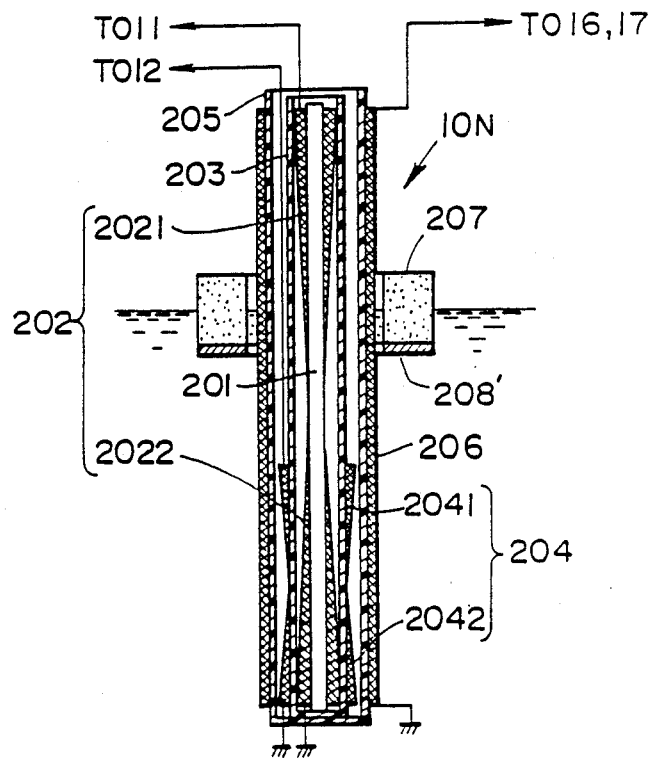
FIG. 26 is a view similar to FIG. 22, but showing a fourteenth embodiment of the invention.

Referring to FIG. 26, there is shown a liquid level detecting device 10N of a fourteenth embodiment of the present invention. In this embodiment, a metal ring 208' constructed of for example aluminium or the like is used in place of the short circuit ring 208 of coil. The metal ring 208' consumes the magnetic energy on the principle of eddy-current loss. As the short ring 208, a ring constructed of magnetic powder-impregnated plastic is also usable in the invention.

If desired, the following modifications are also possible in the invention. One of them is a modification in which a suitable condenser is connected in series with the coil of the short circuit ring 208 to provide a resonance circuit in the same. With this, a current flowing in the circuit is increased thereby increasing the energy consumption of the short circuit ring 208. Accordingly, the output from the measuring coil 206 is increased.

Although in the above-mentioned embodiments 10A to 10N, the upper and lower coil sections 1221 and 1222 (or 2021 and 2022) of the primary exciting coil 122 (or 202) and those 2041 and 2042 of the auxiliary exciting coil 204 are each arranged to be symmetrical with respect to the middle portion therebetween, the primary and auxiliary exciting coils 122 (or 202) and 204 may each have an asymmetrical construction so long as the arrangement including afore-mentioned winding density inclination is employed.

Although, in the foregoing description, the coil bobbins are described to be constructed of iron or plastics, they may be constructed of other material. If desired, an air-cored arrangement may be used in the invention.

What is claimed is:

1. A device for measuring a displacement of a movable member relative to a fixed member, comprising:
   an AC signal source;
   a first coil mounted to said fixed member and including first and second coil sections which are electrically connected and coaxially aligned along a common axis so that the first coil has a first extreme end constituting an outside end of said first coil section, a middle portion defined between respective inside ends of said first and second coil sections and a second extreme end constituting an outside end of said second coil section;

a second coil coaxially disposed within said first coil and mounted to said fixed member so as to establish a magnetic coupling with said first coil, an end of one of said first and second coils being connected to said AC signal source to receive an AC signal;

a short circuit ring fixed for movement with said movable member, said short circuit ring being disposed upon and located at a predetermined position about said movable member and axially disposed about said first coil so as to establish a magnetic coupling with said first coil and second coil and constructed to consume magnetic energy;

a float constituting said movable member and being connected to said short circuit ring to cause said short circuit ring to remain on top of a fluid; and means connected to an end of the other of said first and second coils for detecting a change in electromagnetic induction between said first coil and said second coil caused by said short circuit ring and for providing an information signal to a detecting circuit which is representative of said change;

wherein the winding density of each of said first and second coil sections of said first coil is gradually decreased from the outside end to the inside end thereof, and the winding density of said second coil is substantially even throughout its length, and wherein the displacement of the float is measured as the float moves in response to a parameter.

2. A device as claimed in claim 1, in which said first coil is wound on an outer coil bobbin.

3. A device as claimed in claim 1, in which said first and second coil sections of said first coil are so arranged as to generate, upon electric energization of said first coil, respective magnetic fluxes in mutually opposed directions.

4. A device as claimed in claim 1, in which said first and second coil sections of said first coil are so arranged as to generate, upon electric energization of said second coil, respective induced electromotive forces mutually opposed directions.

5. A device as claimed in claim 1 wherein said detecting means comprises an analog switch operated in synchronism with said AC signal to pass predetermined portions of said AC signal induced in said second coil, and means for detecting a voltage level of said predetermined portions.

6. A device as claimed in claim 5 wherein said detecting means further includes a circuit receiving said AC signal and outputting a control signal to said analog switch to operate said analog switch to pass said predetermined portions.

7. A device as claimed in claim 6 wherein said predetermined portions are half wave.

8. A device as claimed in claim 1, in which an end portion of said second coil section which includes said second extreme end and an end portion of said second coil which faces said end portion of said second coil section are bent with respect to the common axis.

9. A device as claimed in claim 1, further comprising two additional coils of increased number of turns, said additional coils being connected to said first and second extreme ends of said first coil, respectively.

10. A device as claimed in claim 1, in which said short circuit ring is a closed circuit coil.

11. A device as claimed in claim 1, in which said short circuit ring is an annular member constructed of electrically conductive material.

12. A device as claimed in claim 11, in which said annular member is an annular metal plate.

13. A device as claimed in claim 1, in which said first and second coil sections of said first coil are connected in series.

14. A device as claimed in claim 1, in which said first and second coil sections of said first coil are connected in parallel.

15. A device as claimed in claim 1, in which said second coil is wound on an inner coil bobbin about which said outer coil bobbin and said first coil are coaxially disposed.

16. A device as claimed in claim 15, in which said inner coil bobbin is of a metal core type.

17. A device as claimed in claim 15, in which said outer and inner coil bobbins are constructed of a non-magnetic material.

18. A device as claimed in claim 15, further comprising two additional coils of increased number of turns, said two additional coils being respectively housed in annular recesses formed in axially opposed end portions of said outer coil bobbin.

19. A device as claimed in claim 18, in which said axially opposed end portions are constructed to serve as stoppers for restricting movement of said movable member.

20. A device as claimed in claim 18, in which said first coil is connected through said additional coils to said AC signal source to be fed with the AC signal.

21. A device as claimed in claim 18, in which said second coil is connected through said additional coils to said AC signal source to be fed with the AC signal.

22. A device as claimed in claim 18, further comprising a cylindrical case which receives therein a unit which includes said first and second coils, said two additional coils and the short circuit ring-mounted movable member, said cylindrical case having a plurality of holes for, when mounted in a liquid container, providing a fluid communication between the interior of the case and the exterior of the same.

23. A device as claimed in claim 22, in which said cylindrical case is formed with spaced stoppers for restricting movement of said movable member.

24. A device as claimed in claim 15, further comprising a third coil connected to said fixed member and coaxially disposed about said first coil to extend along the common axis within the range between said middle portion and said second extreme end, said third coil including third and fourth coil sections which are electrically connected and coaxially aligned so that said third coil has a third extreme end constituting an outside end of said third coil section, a middle portion defined between respective inside ends of said third and fourth coil sections and a fourth extreme end constituting an outside end of said fourth coil section, wherein said third and fourth coil sections of the third coil are so arranged as to generate, upon electric energization, respective magnetic fluxes which advance in the mutually opposed directions, and wherein the winding density of each of said third and fourth coil sections is gradually decreased from the outside end to the inside end thereof.

25. A device as claimed in claim 24, in which said first coil is connected with said AC signal source to be fed with an AC signal and in which said third coil is connected with another AC signal source to bed fed with an AC signal.

26. A device as claimed in claim 24, in which said first and second coil sections of said first coil are connected in series.

27. A device as claimed in claim 26, in which said third and fourth coil sections of said third coil are connected in series.

28. A device as claimed in claim 27, in which said third and fourth coil sections of said third coil are connected in parallel.

29. A device as claimed in claim 1, in which said second coil is wound on an inner coil bobbin.

30. A device as claimed in claim 29, in which said first coil is directly wound on said second coil.

31. A device as claimed in claim 30, in which the inner coil bobbin is of a metal core type.

32. A device as claimed in claim 30, in which said inner coil bobbin is constructed of a non-magnetic material.

33. A device as claimed in claim 30, in which said two additional coils are arranged at axially opposed end portions of said inner coil bobbin.

34. A device as claimed in claim 33, in which said first coil is connected through said additional coils to said AC signal source to be fed with the AC signal.

35. A device as claimed in claim 33, in which said second coil is connected through said additional coils to said AC signal source to be fed with the AC signal.

36. A device as claimed in claim 33, further comprising a cylindrical case which receives therein a unit which includes said first and second coils, said two additional coils and the short circuit ring-mounted movable member, said cylindrical case having a plurality of holes for, when mounted in a liquid container, providing a fluid communication between the interior of the case and the exterior of the same.

37. A device as claimed in claim 36, in which said cylindrical case is formed with spaced stoppers for restricting movement of said movable member.

38. A device as claimed in claim 30, further comprising a third coil connected to said fixed member and coaxially disposed about said first coil to extend along the common axis within the range, between said middle portion and said second extreme end, said third coil including third and fourth coil sections which are electrically connected and coaxially aligned so that said third coil has a third extreme end constituting an outside end of said third coil section, a middle portion defined between respective inside ends of said third and fourth coil sections and a fourth extreme end constituting an outside end of said fourth coil section, wherein said third and fourth coil sections of the third coil are so arranged as to generate, upon electric energization, respective magnetic fluxes which advance in the mutually opposed directions, and wherein the winding density of each of the third and fourth coil sections is gradually decreased from the outside end to the inside end thereof.

39. A device as claimed in claim 38, in which said first coil is connected with said AC signal source to be fed with an AC signal and in which said third coil is connected with another AC signal source to be fed with an AC signal.

40. A device as claimed in claim 1, further comprising a third coil connected to said fixed member and extending along the common axis within the range between said middle portion and said second extreme end, said third coil including third and fourth coil sections which are electrically connected and coaxially aligned so that said third coil has a third extreme end constituting an outside end of said third coil section, a middle portion defined between respective inside ends of said third and fourth coil sections and a fourth extreme end constituting an outside end of said fourth coil section, wherein said third and fourth coil sections of the third coil are so arranged as to generate, upon electric energization, respective magnetic fluxes which advance in the mutually opposed directions, and wherein the winding density of each of said third and fourth coil sections is gradually decreased from the outside end to the inside end thereof.

41. A device as claimed in claim 40, in which said first and second coil sections of said first coil are connected in parallel.

42. A device as claimed in claim 41, in which said third and fourth coil sections of said third coil are connected in series.

43. A device as claimed in claim 41, in which said third and fourth coil sections of said third coil are connected in parallel.

* * * * *